(12) United States Patent
Kajita et al.

(10) Patent No.: US 6,509,985 B1
(45) Date of Patent: Jan. 21, 2003

(54) PARALLEL TRANSMISSION METHOD AND SYSTEM

(75) Inventors: Mikihiro Kajita, Tokyo (JP); Junichi Tsuchida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/363,408

(22) Filed: Jul. 29, 1999

(30) Foreign Application Priority Data

Aug. 7, 1998 (JP) ............................................ 10-223808

(51) Int. Cl.7 ................................................ H04J 14/00
(52) U.S. Cl. ........................ 359/115; 359/122; 359/156; 359/158
(58) Field of Search ................................ 359/158, 156, 359/154, 115, 122, 124, 135, 140

(56) References Cited

U.S. PATENT DOCUMENTS 5,497,261 A * 3/1996 Masetti ........................ 359/158
5,629,983 A * 5/1997 Fujimoto ................. 359/158 X

FOREIGN PATENT DOCUMENTS

| JP | 63-86630 | 4/1988 |
| JP | 64-89829 | 4/1989 |
| JP | 01-144832 | 6/1989 |
| JP | 02-39740 | 2/1990 |
| JP | 4-168841 | 6/1992 |
| JP | 05-102930 | 4/1993 |
| JP | 05-300188 | 11/1993 |
| JP | 09-18422 | 1/1997 |
| JP | 10-98439 | 4/1998 |
| JP | 10-145350 | 5/1998 |

* cited by examiner

*Primary Examiner*—Thomas Mullen
(74) *Attorney, Agent, or Firm*—Sughrue Mion, PLLC

(57) ABSTRACT

A system that affords synchronization signals for adjusting the skew in parallel transmission without producing data overhead to enable high-efficiency large-capacity transmission. On a transmitter side, a transmitter outputs two wavelengths. The transmitter transmits the data signals for transmission as it switches from a first wave length to a second wavelength at a certain synchronization timing. A wavelength filter separates a first wavelength and a second wavelength on a receiving side at the pre-stages of receivers receiving the data signals of the respective transmission paths. Data D1 and D2, separated in association with the first and second wave lengths, are stored in buffers B11, B12 to detect oncoming of data signals with maximum delay in the respective transmission paths. The data are output simultaneously from the second buffer B2 to the respective transmission paths in a timing of the data having the maximum delay.

12 Claims, 13 Drawing Sheets

FIG. 11
PRIOR ART
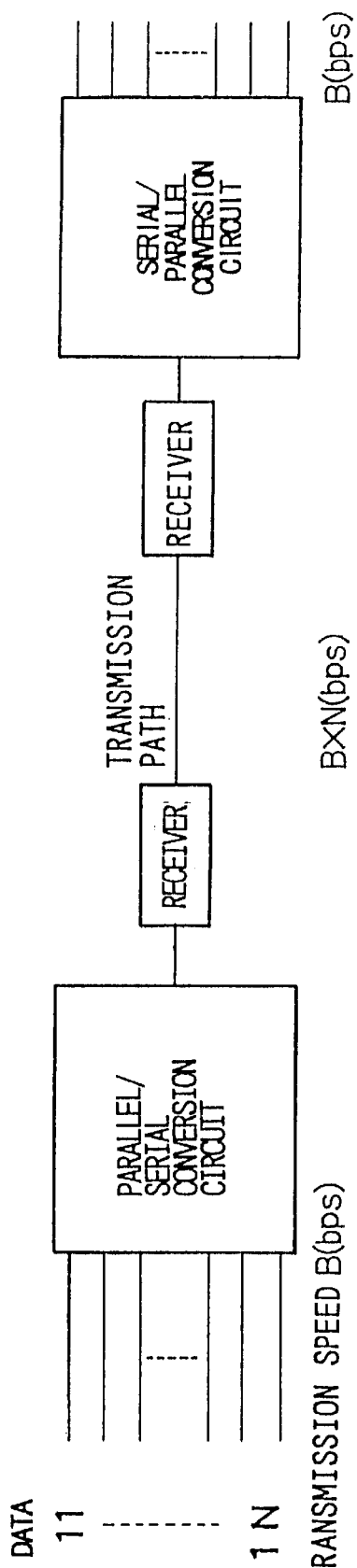
(a) SERIAL TRANSMISSION
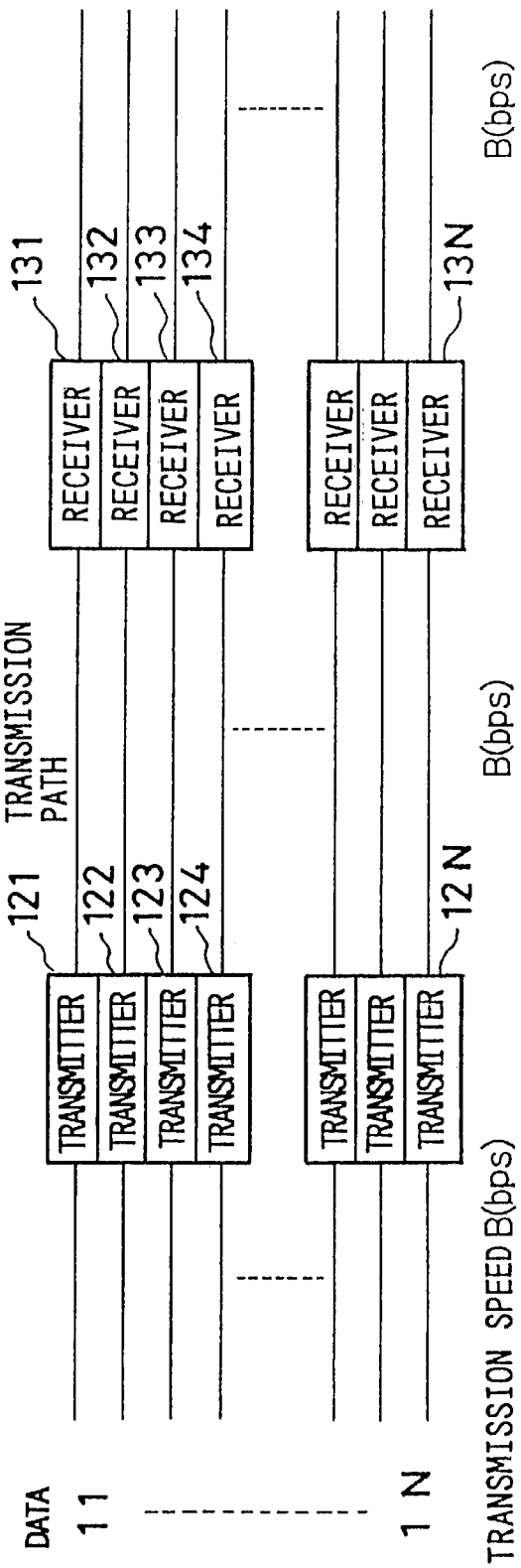
(b) PARALLEL TRANSMISSION

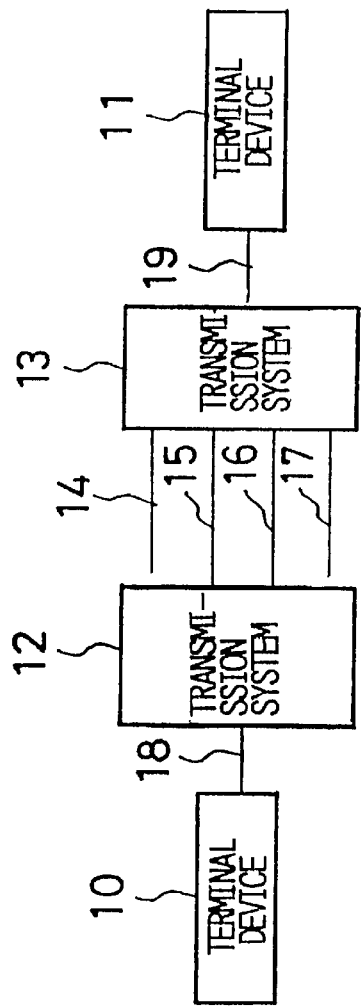
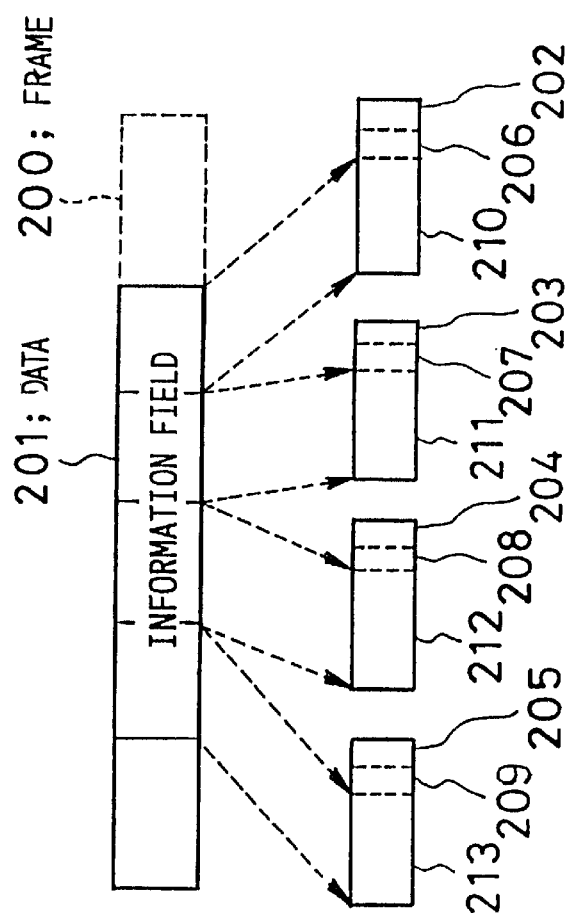
FIG. 13
PRIOR ART

PARALLEL TRANSMISSION METHOD AND SYSTEM

FIELD OF THE INVENTION

This invention relates to a method and a system for parallel transmission. More particularly, it relates to a method and a system for parallel transmission applied with advantage to high efficiency large capacity transmission under performing skew adjustment in parallel transmission.

BACKGROUND OF THE INVENTION

Since limitations are imposed on the performance of a stand-alone computer, the recent tendency is to adopt a clustering system comprised of plural interconnected computers. In order to keep up with such tendency, the interconnection between computer nodes requires a bandwidth with a larger and larger capacity. For example, a standard for high-speed transmission on Fibre Channel is coming into widespread use.

In this standard, signals transmitted in parallel are serialized by a conversion LSI (parallel/serial conversion circuit), which are transmitted, as shown in FIG. 11a. The received serial signal is deserialized into parallel signals by a conversion LSI (serial/parallel conversion circuit).

There is a variety of limiting factors in the realization of the high speed of the serial signals. One of these limiting factors is that a cable for transmitting high-speed electrical signals attenuates high frequency signals, such that a strict limitation is imposed as to the transmission distance.

For example, in a transmission speed of an order of 1.25 Gbps, the transmission distance cannot be increased beyond approximately 40 m even if there is annexed a function of compensating frequency characteristics in the form of an equalizer. This means that only a limited system configuration is possible.

If optical signals are used, it is possible to realize a higher transmission speed and a longer transmission distance than is possible with the electrical signals. The transmission speed of up to 10 Gbps has been verified with the use of the current optical communication techniques. However, high-speed optical components are rather costly.

Thus, there is proposed a parallel transmission system of transmitting parallel signal in a computer casing directly as low-speed parallel signals, not on a sole transmission path, but on plural transmission paths as shown in FIG. 11(b).

For the parallel transmission system, it may be envisaged to use electrical signals or optical signals. The parallel transmission system may be realized not only by transmitting the low-speed signals on plural transmission paths, but also by serializing the low-speed parallel signals which are transmitted over plural transmission paths.

Meanwhile, in the parallel transmission system, there is produced skew (delay) among respective transmission paths, so that means need to be provided to synchronize the data being transmitted on the respective transmission paths. As a first method for synchronizing the data among the respective transmission paths, there is used such a method in which a frame synchronization pattern is inserted as a data header for synchronization among the transmission paths based on this fixed pattern. As the frame synchronization system in this sort of the parallel transmission paths, there is disclosed in JP Patent Kokai JP-A-63-86630 a structure in which it is unnecessary to provide a frame synchronization circuit from one transmission path to another, as shown in FIG. 12. Specifically, a frame synchronization circuit 107 is provided in a parallel transmission paths and the variable delay elements 113, 114 are controlled depending on the phase difference between the frame synchronization on this transmission path and the parallel synchronization information on another transmission path for realizing frame synchronization in the parallel transmission paths.

As a second method, there is known a method in which, in parallel transmission of divided (or split) transmission data, an identifier, a sequential number etc. is introduced as a header in each frame of signals for use in reconstructing data based on this sequential number etc. As typical of this system, there is proposed in, for example, the JP Patent Kokai JP-A-4-168841 a frame transmitting/receiving system in which an exchanging device on the transmitting side, among plural exchanging devices interconnected by plural lines, splits data of a frame, formulates plural split frames by attaching frame identifiers and split frame sequential numbers, and transmits the split frames in parallel over different lines, and in which an exchanging device on the receiving side assembles the split frames to construct a sole frame based on the frame identifier and the split frame sequential number to diminish the transmission delay time among the exchanging devices, as shown in FIG. 13.

The above-described conventional method accords a header as an overhead to every data signal, thus increasing redundancy in data or data signals. This data redundancy obstructs efficient data transfer, while placing limitations on the transmission capacity.

SUMMARY OF THE DISCLOSURE

It is therefore a general object of the present invention to overcome the aforementioned problems.

Specifically, it is an object of the present invention to provide a method supporting high efficiency large capacity transmission by according synchronization signals for skew adjustment in the parallel transmission without recourse to data overhead.

According to an aspect of the present invention there is provided a parallel transmission method including changing the transmission wavelength on a transmitting side at a pre-set synchronization timing of data transmitted on parallel transmission paths, detecting these changes in wavelength on a receiving side, and synchronizing the data transmission among respective transmission paths of the parallel transmission paths based on the results of detection.

According to a second aspect of the present invention, there is also provided a parallel transmission method including changing the state of polarization on a transmitting side at a pre-set synchronization timing of data transmitted on parallel transmission paths, detecting these changes in polarization on a receiving side and synchronizing the data transmission among respective transmission paths of the parallel transmission paths based on the results of detection.

According to a third aspect of the present invention, there is also provided a parallel transmission apparatus including a transmitter in each of transmission paths for parallel transmission capable of outputting signals of at least two wavelengths. The transmitter transmits data signals for transmission as the transmitter switches from a first one of the wavelengths to a second one of the wavelengths at a certain synchronization timing. The parallel transmission apparatus also includes a wavelength filter provided at a pre-stage of a receiver receiving the data signals on each transmission path, for separating the first wavelength and the second wavelength from each other. Each receiver receives first data and second data separated in association with the first and second wavelengths, and causes the received first and second data to be stored in first and second storage means, respectively.

Each receiver detects the oncoming of the data signals with the maximum delay on the transmission paths. The parallel transmission apparatus also includes means for synthesizing the first and second data from the first and second storage means and for performing control to output the synthesized data simultaneously on the respective transmission paths in the timing of the data with a maximum delay.

PREFERRED EMBODIMENTS OF THE INVENTION

Explanation is made of present embodiments of the present invention. In a preferred first embodiment of the present invention, the transmitting wavelength or the state of polarization is changed as shown in FIG. 1, e.g., at a partition point of data on each of parallel transmission paths, in the case of optical transmission, and the receiving side detects resulting changes in the state of transmitted light to achieve synchronization among respective transmission paths. In the case of electrical signals, synchronization of data transmission is realized such as by changing the frequency, e.g., at a partition point of data on each of parallel transmission paths.

More specifically, in a preferred first embodiment of the present invention, shown in FIG. 1, there is provided an optical transmitter in each of transmission paths for parallel transmission capable of outputting signals of at least two wavelengths (transmitters 411 to 41N), these transmitters transmitting data signals for transmission as the transmitter switches from a first one of the wavelengths to a second one of the wavelengths at a certain synchronization timing. There is also provided a wavelength filter at upstream (pre-stage) of each receiver receiving the data signals on each transmission path (wavelength filters 431 to 43N), for separating the first wavelength and the second wavelength from each other. Each receiver receives first data and second data separated in association with the first and second wavelengths, and causes the received first and second data to be stored in buffers (B11-1, B11-2), respectively, whereupon oncoming of the last coming data signal (i.e., with the maximum delay) on the transmission paths is detected. The first and second data from the buffers (B11, B12) are synthesized (or combined) and the synthesized data are simultaneously output from buffers B21 to B2N on the respective transmission paths in the timing of the last coming data (with the maximum delay).

In the present embodiment of the present invention, transmission only of a data length D, devoid of redundancy, is possible in the parallel transmission system, with the receiving side synchronizing received data. With a header length H, for example, the data transmission efficiency can be improved by a factor of 1+H/D as compared with the conventional system.

In its second embodiment, the present invention includes, as shown in FIG. 5, an optical transmitter for each transmission path which is able to output the light of different polarizations. Each of the transmitters transmits data for transmission as it switches from a first state of polarization to a second state of polarization upstream synchronization timing. There is provided on the receiving side a polarization filter for separating data of first polarization and a polarization filter for separating data of second polarization at upstream of the receivers adapted for receiving data signals of the respective transmission paths (polarization filters 531 to 53N). The first and second data separated in association with the first and second polarizations are received by the receivers and stored in first buffers (B11, B12). The oncoming of the last data signal from the transmission paths with the maximum delay is detected. The first and second data from the first buffers (B11, B12) are synthesized. The synthesized data is output simultaneously on the respective transmission paths from second buffers (B21 to B2N) in the timing of the data having the maximum delay.

In its third embodiment, the present invention provides a parallel transmission system including a multiplexer 651 for multiplexing the polarized light signals from plural optical transmitters for transmitting the multiplexed polarized light signals on transmission paths, as shown in FIG. 7. There is also provided a wavelength filter 661 for separating a first one of two polarizations separated in association with the first and second states of polarization into first and second wavelengths.

The first and second data separated in association with the first and second states of polarization, respectively, are received by the receivers and stored in the first buffers, respectively. The oncoming of the last data signal with the maximum delay is detected. The data of the second polarized light signal is directly stored in the associated first buffer. The first and second data signals from the first buffer are synthesized and the resulting synthesized data signals and data signal of the second polarization are simultaneously output on the respective transmission paths in the timing of the data signal with the maximum delay.

In its fourth embodiment, the present invention includes a multiplexer 751 on a transmitting side for multiplexing the wavelengths from plural optical transmitters and for transmitting the multiplexed wavelengths on the transmission paths, as shown in FIG. 9.

BRIEF DESCRIPTION OF THE DRAWINGS

FIG. 11 shows an example of a frame synchronization system of the conventional parallel transmission system.

FIG. 13 shows yet another example of a conventional frame synchronization system.

DETAILED DESCRIPTION OF EMBODIMENTS OF THE INVENTION

Figure 1:
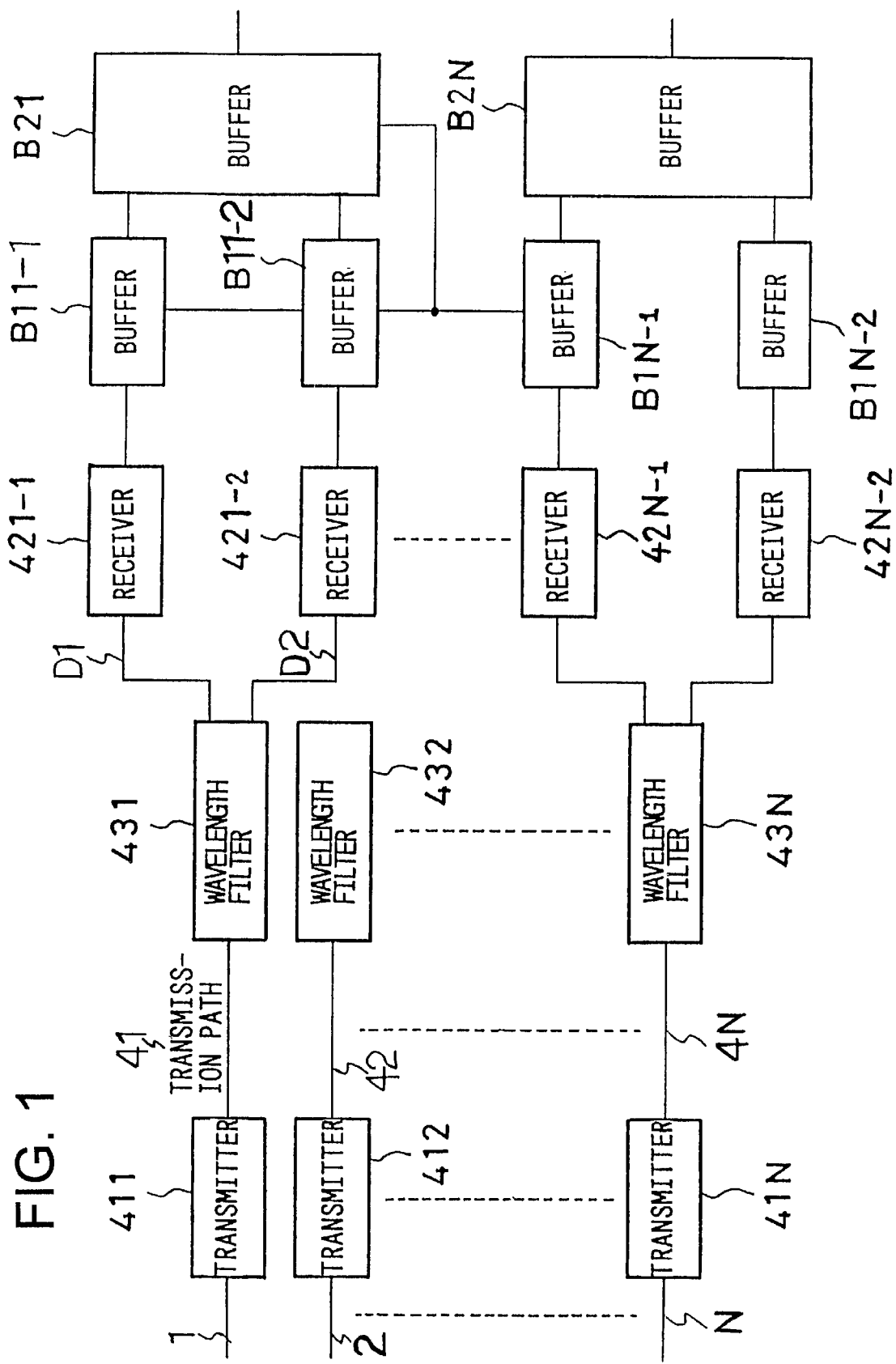
FIG. 1 shows the structure of a first embodiment of the present invention.

Referring to the drawings, preferred embodiments of the present invention will be explained in detail. Referring to FIG. 1, showing the structure of the first embodiment of the present invention, the first embodiment includes optical transmitters 411 to 41N, having plural wavelength transmitting functions, transmission paths for parallel transmission 41 to 4N, wavelength filters 431 to 43N for allowing transmission of the transmitted information at upstream of receivers, receivers 421(421-1, -2) to 42N(42N-1, -2) for receiving data separated by the wavelength filters, first buffers B11-1, B11-2 associated with each of the receivers for each of the transmission paths, and a second buffer B2 for each transmission path.

Operation of the embodiment shown in FIG. 1 is explained. Referring to FIG. 1, this embodiment includes the optical transmitters 411 to 41N, that are able to output at least two wavelengths to respective transmission paths 41 to 4N, and that transmit every data signal as a data signal for transmission switched from a wavelength λ1 to another wavelength λ2 at a certain synchronization timing.

The data signals, transmitted over the transmission paths 1 to N, are subjected to skew reciprocally because of non-equal lengths of the transmission paths. When these signals are received by the receivers 421 to 42N, data with the wavelength λ1 is adapted to be separated from the data with the wavelength λ2 by wavelength filters 431 to 43N provided at pre-stages of the receivers 421 to 42N.

The split data, having the wavelengths λ1, λ2, are termed D1 and D2, respectively. These data D1 and D2, received by the receivers 421 to 42N, are stored respectively in the first and second buffers B11, B12, respectively.

Figure 2:
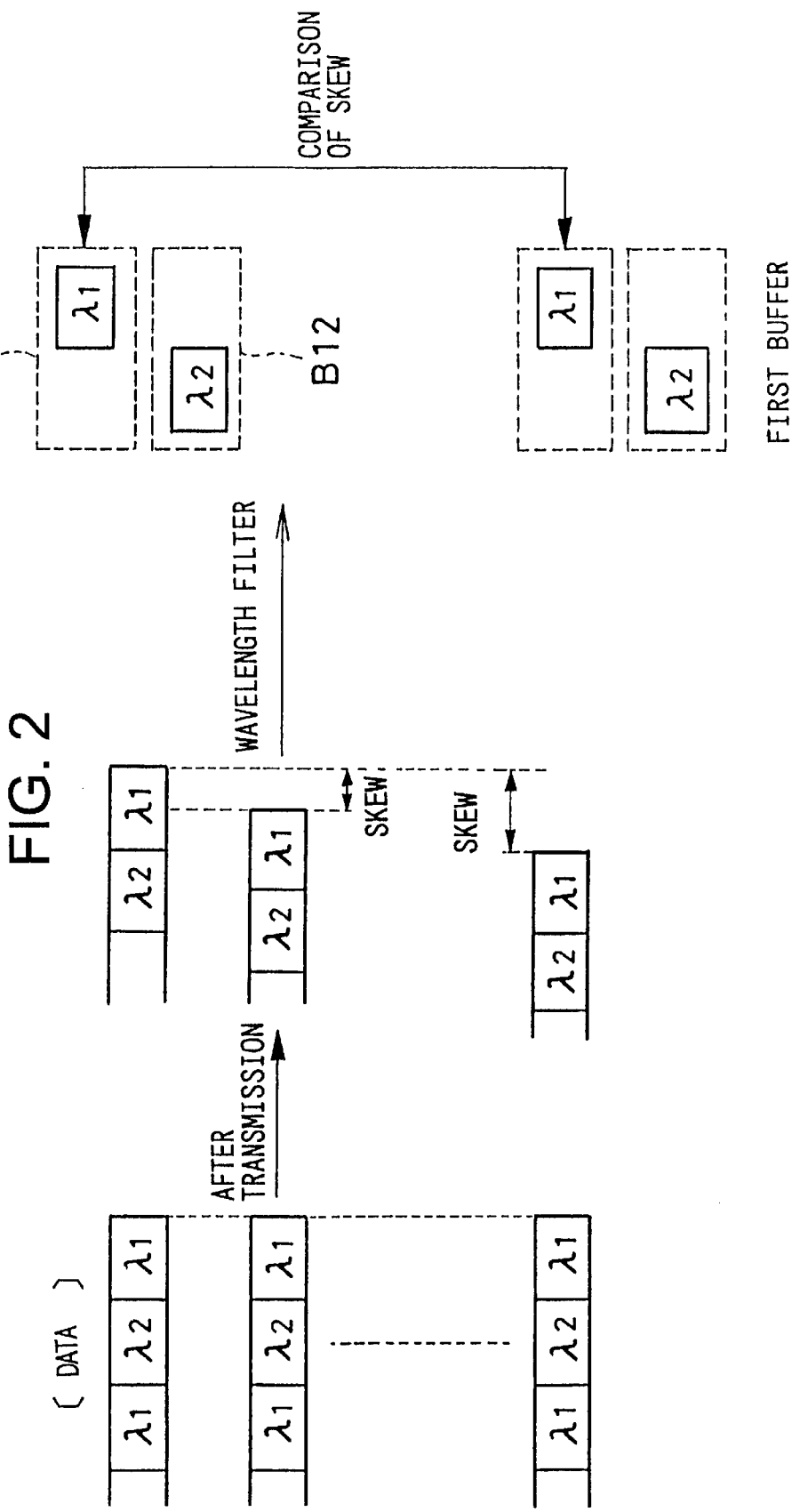
FIG. 2 is a schematic view for illustrating the operation of the embodiment of FIG. 1.
Figure 3:
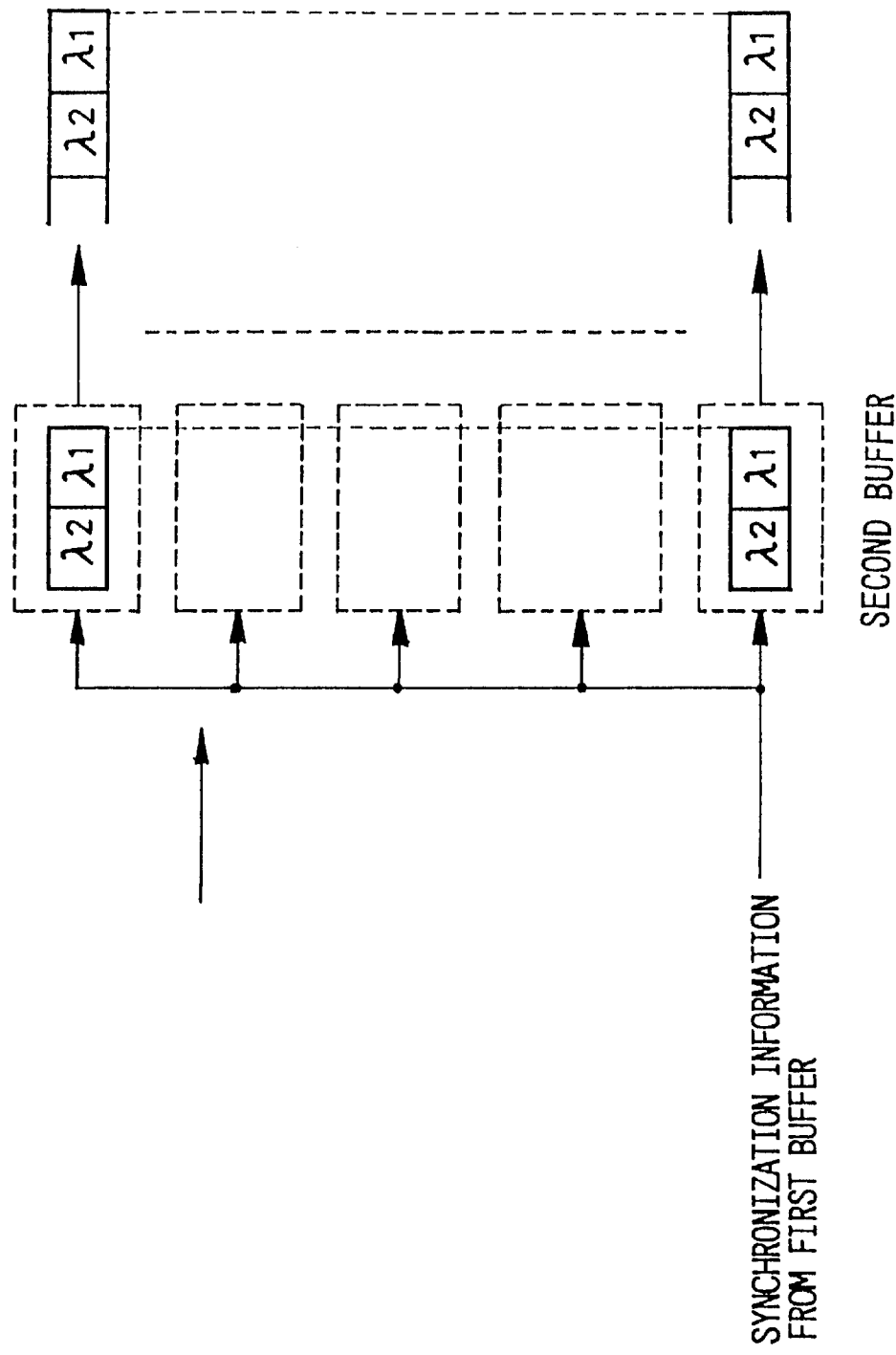
FIG. 3 similarly to FIG. 2, is a schematic view for illustrating the operation of the embodiment of FIG. 1.

The oncoming of a data signal with the maximum delay among the respective transmission paths is detected by the first and second buffers B11, B12, as shown in FIG. 2. In this case, the synchronization timing is detected by the data, e.g., of the wavelength λ2, to detect the skew among the transmission paths.

Then, the data D1 and D2 are sent to the second buffers B11-1, B11-2, which then synthesize the data D1 with the wavelength λ1 and the data D2 with the wavelength λ2 and output the two data simultaneously at the timing of the data with the maximum delay as obtained by the first buffer B11-1, B11-2 (received data at the most delayed timing).

Figure 4:
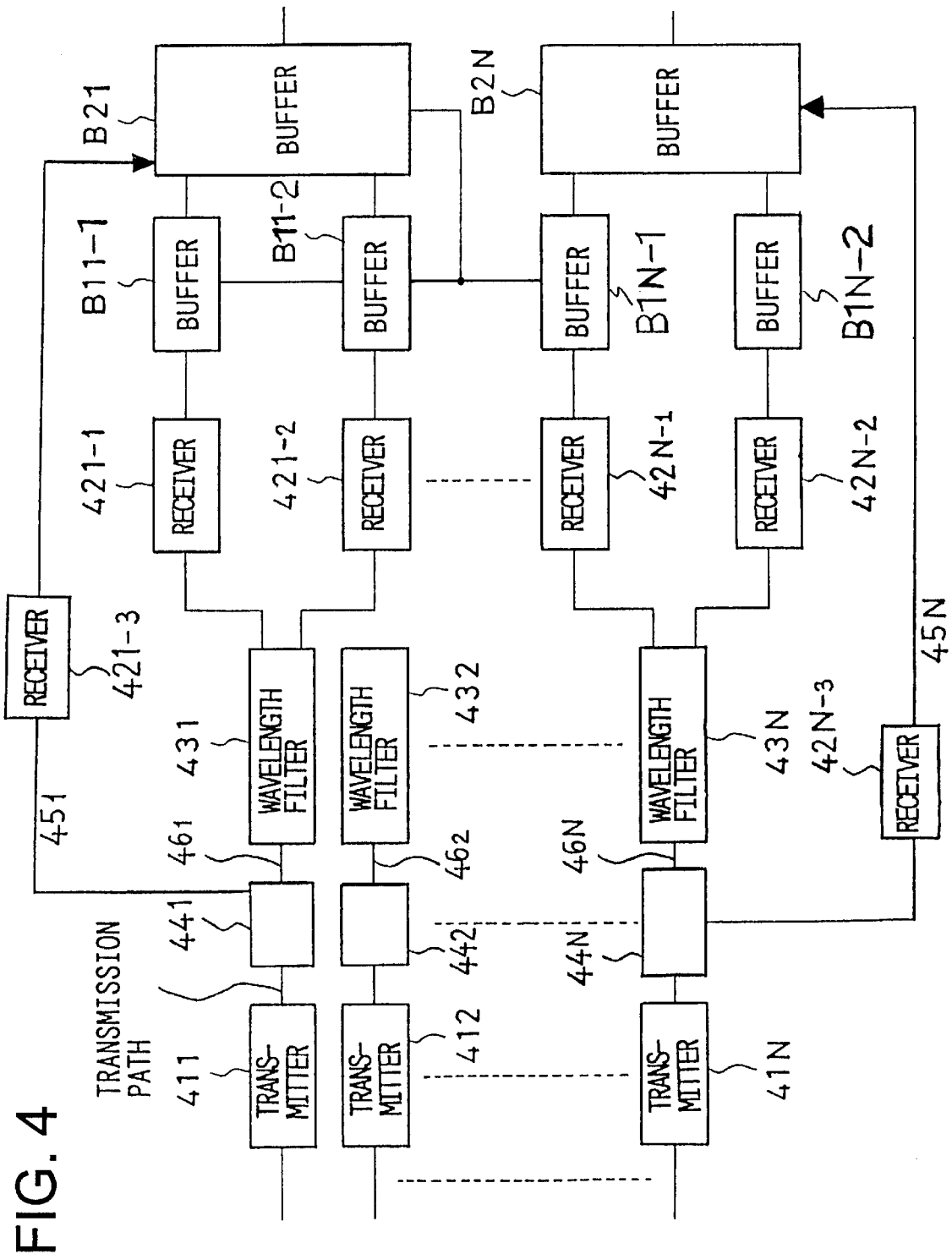
FIG. 4 shows a modification of the first embodiment.

In a modification of the first embodiment as shown in FIG. 4, the receiving side splits the data sent over each of the transmission paths into two by 1:2 optical couplers 441 to 44N, and stores the information on the paths 45(451 to 45N) via a receiver (421-3 to 42N-3) directly as data signals in the second buffers B2(B21 to B2N), respectively, while splitting the information on the path 46(461 to 46N) into data of the wavelength λ1 via wavelength filters 431 to 43N and data of the wavelength λ2 to route the data to the receivers 421 (421-1, 421-2) to 42N(42N-1, 42N-2). Here, the information on the arrival of the λ1 data and the λ2 data is acquired and the two data are sent out in unison on the respective transmission paths from the second buffers B21 to B2N provided on the path 45(451 to 45N) in the timing of the data of the transmission path delayed to the maximum extent.

As the optical transmitter, a tunable wavelength laser diode (LD) or plural LDs having different oscillation wavelengths may be used. As a wavelength filter, an array waveguide grating (AWG) filter, for example, may be used.

If electrical transmission is used in the above-described embodiment, the frequency information may be used instead of the wave length information. In this case, the transmitters are those oscillated at different frequencies, while frequency filters are required in place of wavelength filters. Basically, the control method is similar to the one explained in connection with the first embodiment described above.

Figure 5:
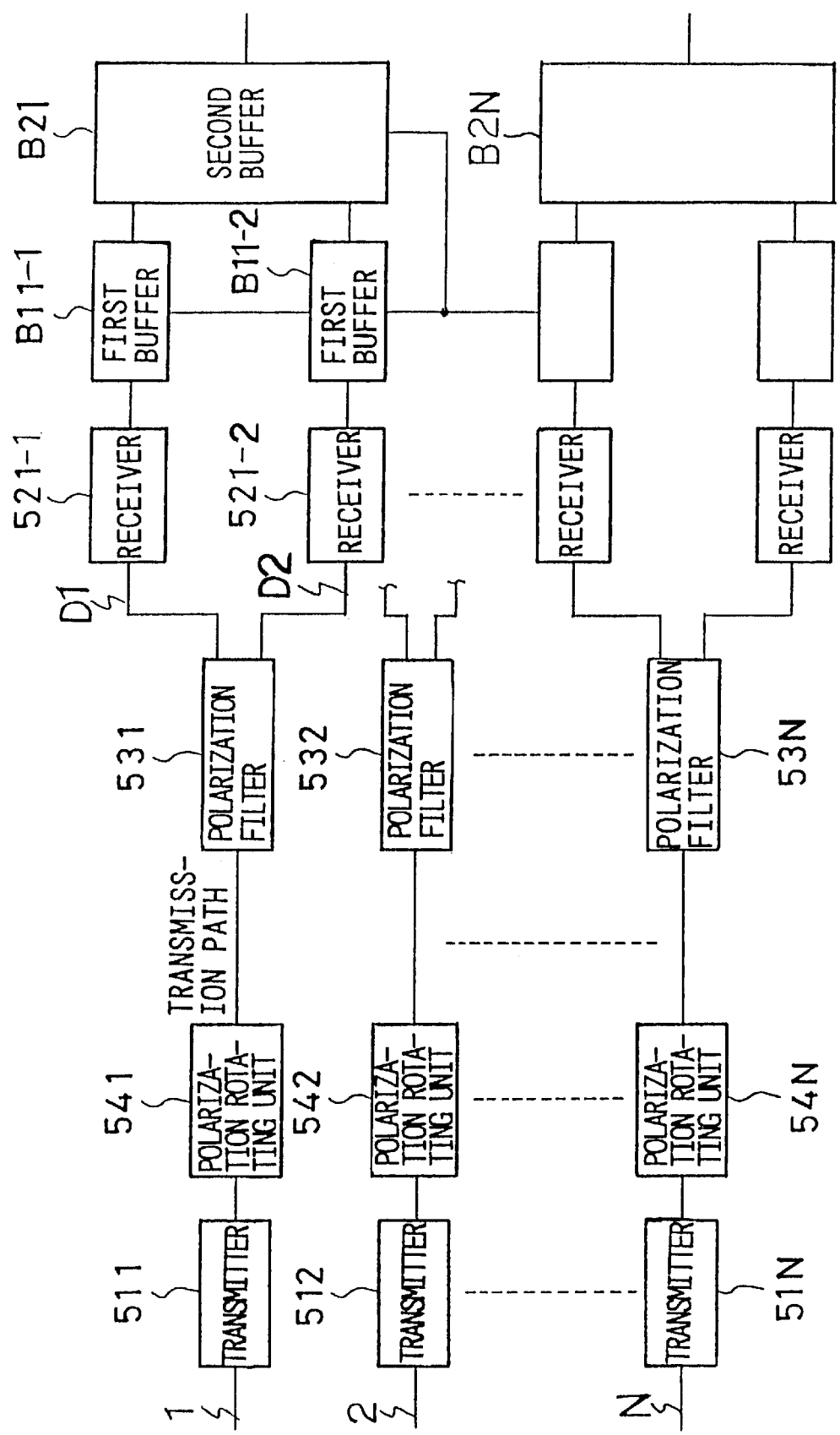
FIG. 5 shows the structure of a second embodiment of the present invention.

A second embodiment of the present invention is explained with reference to FIG. 5 showing its configuration. Referring to FIG. 5, the present second embodiment exploits the polarised light in place of the wavelength in the first embodiment explained in connection with FIG. 1. In doing parallel transmission, optical transmitters 511 to 51N, capable of outputting at different polarizations, are provided as a transmitter of each of the transmission paths 1 to N. The data signals for transmission are switched from a polarisation p1 to a polarisation p2 at a certain synchronization timing to effect the transmission. The data signals transmitted on the transmission paths 1 to N undergo skew reciprocally due to unequal transmission paths lengths. When these signals are received by the receivers 521(521-1, -2) to 52N(52N-1, -2), data of the polarization p1 and those of the polarization p2 are adapted to be separated from each other by polarizing filters 531 to 53N in the pre-stages of the receivers 521 to 52N. The data D1 and D2, thus split, are stored in the first buffers B11-1 and B11-2.

In the first buffers, the oncoming of data signals on the transmission path with the maximum delay is detected. The data D1 and D2 are sent to the second buffers B21 to B2N, where the data D1 and D2 are synthesized and output simultaneously in the timing of the data with the maximum delay obtained in the buffer B11(B11-1, -2).

Figure 6:
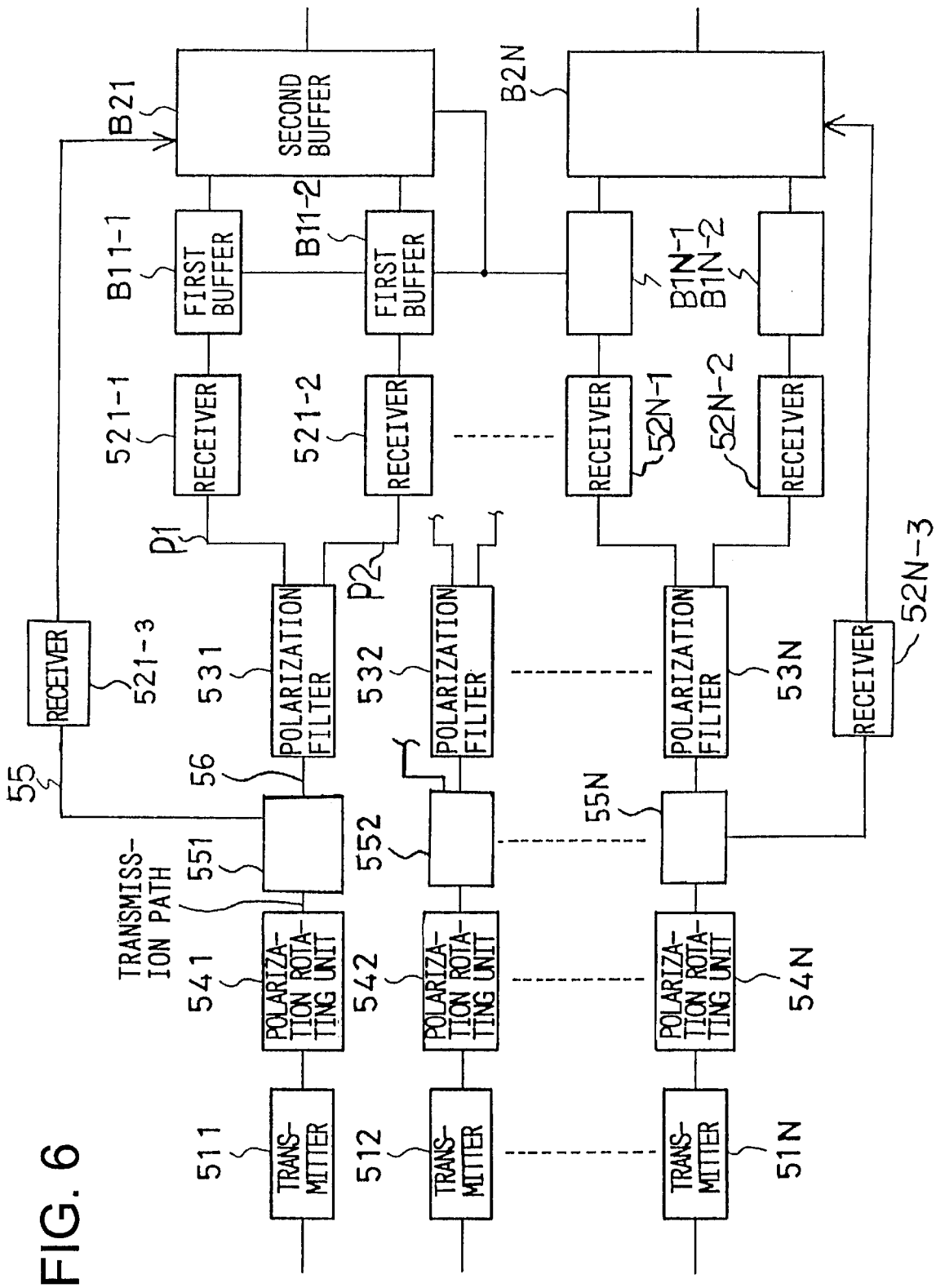
FIG. 6 shows a modification of the second embodiment.

In an alternative configuration as shown in FIG. 6, the receiving side splits the data sent from the transmission path into two by 1:2 optical couplers 551 to 55N and stores the information on the path 55 directly as data signals in the second buffer B21 via a receiver (521-3 to 52N-3), On the other hand, the information on the path 56 is split into data with a polarization p1 and data with a polarization p2 by being passed through the polarizing filters 531 to 53N. These data are input to receivers 521(521-1, -2) to 52N(52N-1, -2) and stored in the first buffers B11-1 and B11-2. The information on the oncoming of the data p1 or data p2 over the respective transmission paths is derived in the first buffers and the respective data are output in unison on the respective transmission paths from the second buffers B21 to B2N provided on the path 55 in the timing of the data on the transmission path with the maximum delay.

If polarization is used, polarization-maintaining fibers are used as the fibers for transmission because usual fibers cause rotation of the polarization.

As the optical transmitter, an edge-emitting LD, which causes polarization only in one direction, may be used. A Faraday polarization rotating unit 541, for example, may be inserted ahead of the transmitter, so that the data p1 is polarized as in the edge-emitting LD and the data p2 is the polarized light the direction of polarization of which is rotated 90 degrees by the polarization rotating unit.

Figure 7:
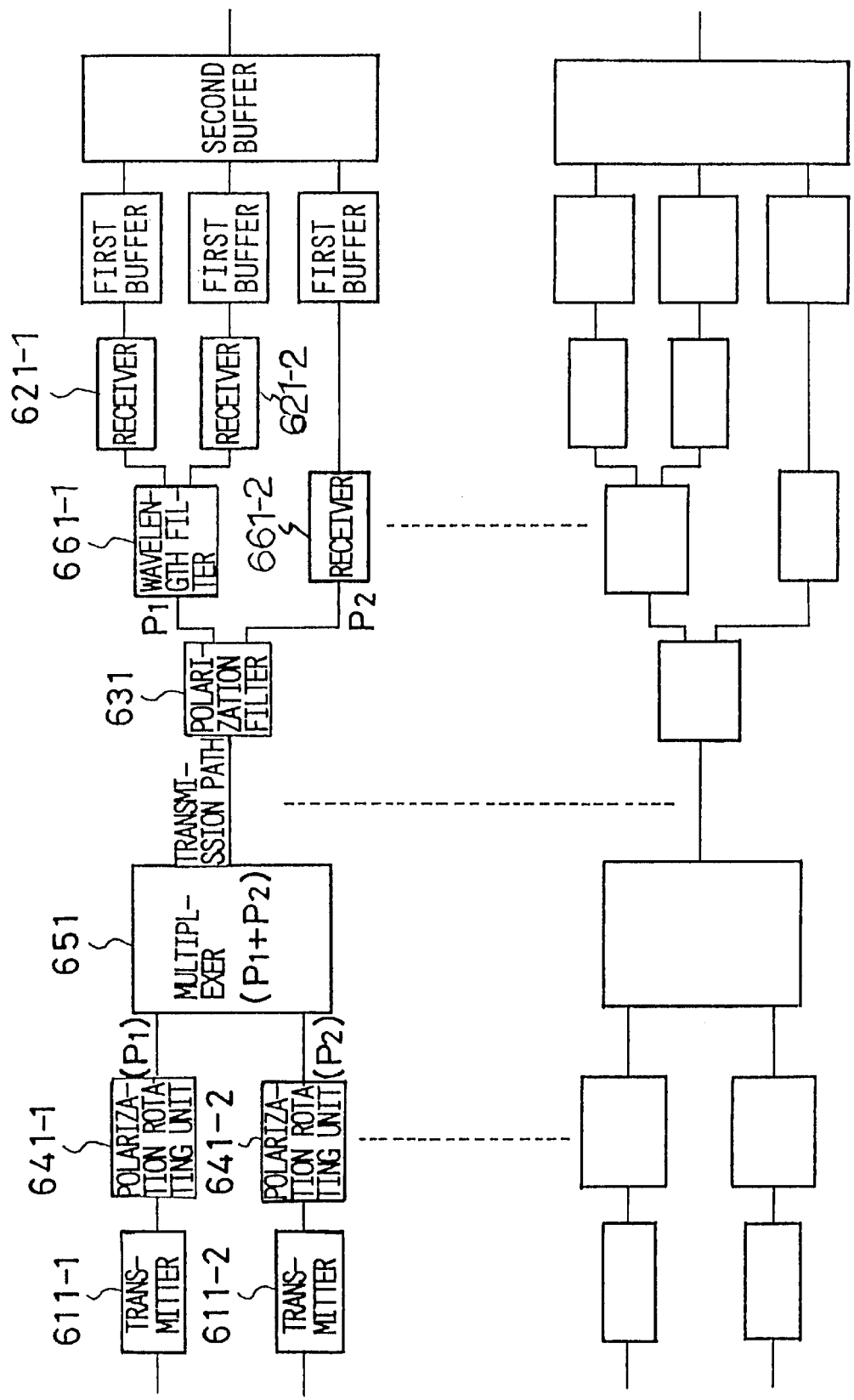
FIG. 7 shows the structure of a third embodiment of the present invention.
Figure 8:
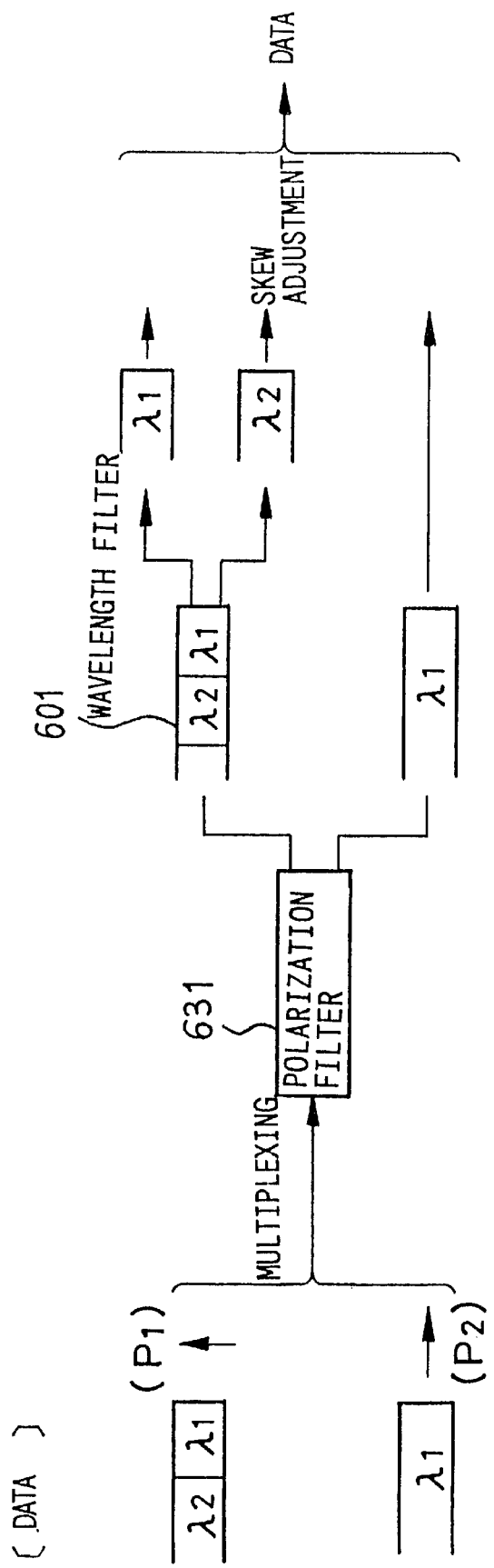
FIG. 8 is a schematic view for illustrating the operation of the third embodiment.

A third embodiment of the present invention is now explained. FIG. 7 shows the structure of the present third embodiment. Referring to FIG. 7, showing the third embodiment, substantially similar to the above-described first embodiment, the optical transmitter of each transmission path having both the function of transmitting at least two wavelengths and the function of transmitting different polarizations is used. That is, optical signals processed by a multiplexer 651 are transmitted on the transmission path.

If the wavelength is used as the optical information for synchronization among different transmission paths, skew adjustment is performed as in the first embodiment described above and multiplexing is done by polarization. In this case, the degree of multiplexing is 2 in each transmission path.

The different states of polarization, if transmitted simultaneously on a transmission path, are not combined, but are transmitted independently of each other. The wavelength information for synchronization needs to be inserted into only one of the polarized states. For example, if a skew adjustment signal is introduced into the polarization p1, it suffices to transmit only the signal with the wavelength $\lambda 1$ for the polarization p2. Of course, skew adjustment signals may similarly be introduced into the polarization p2 if control is thereby facilitated.

Each of the receiving side has a polarization filter 631 ahead the wavelength filter 661(661-1, -2) and separates the polarized light multiplexed by the polarization filter 651.

The processing following the separation into the polarization p1 and the polarization p2 is the same as that explained in connection with the first embodiment described above. However, since it suffices if skew adjustment is made in one of the polarized states, such as in p1, the information of the other polarized state, such as p2, may be output in the same timing as that of the information on p1. That is, the information on the polarization p2 is input from the receiver 661-2 to the first buffer, and is output at the same timing as the data of the polarization p1.

In the present embodiment, there is provided the multiplexer 651 in each transmission path for multiplexing the polarization of polarization rotating units 641-1 and 641-2 polarizing the outputs of the transmitters 611-1 and 611-2.

Figure 9:
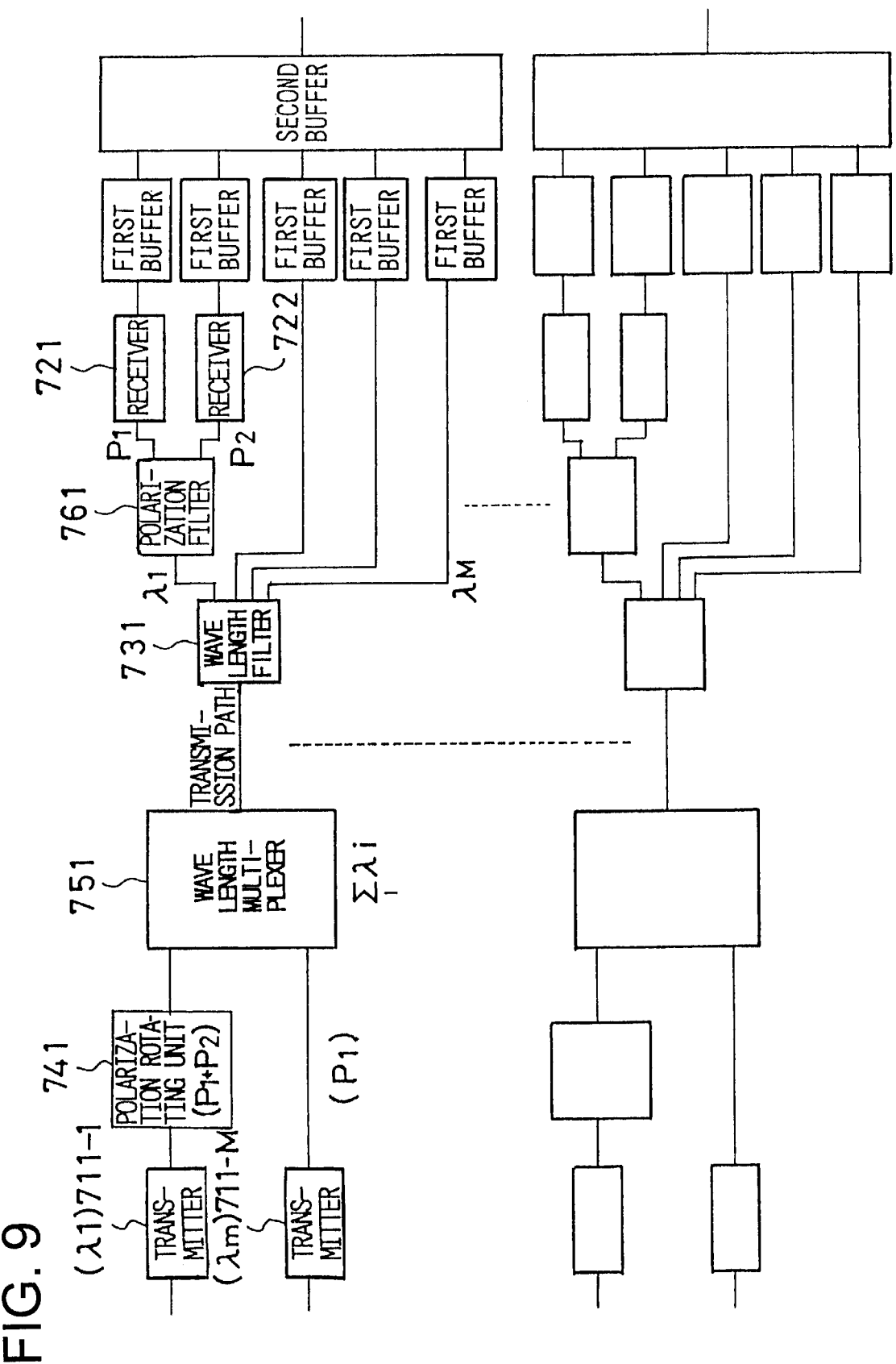
FIG. 9 shows the structure of a fourth embodiment of the present invention.
Figure 10:
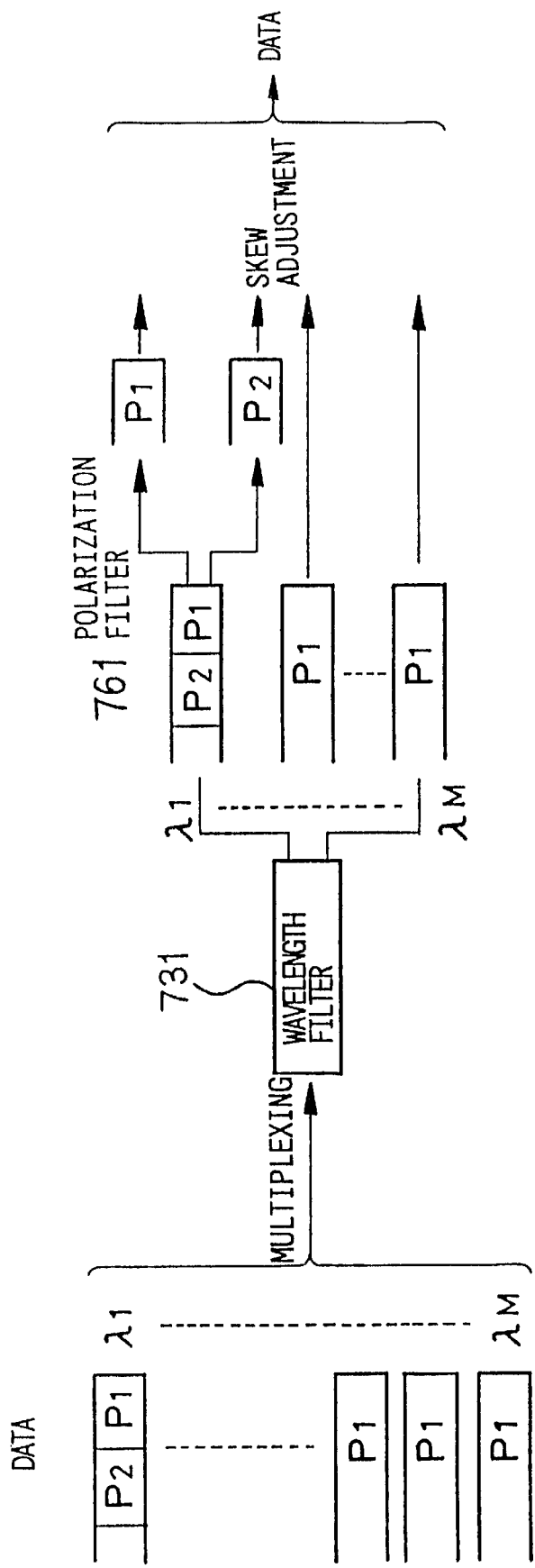
FIG. 10 is a schematic view for illustrating the operation of the fourth embodiment.
Figure 12:
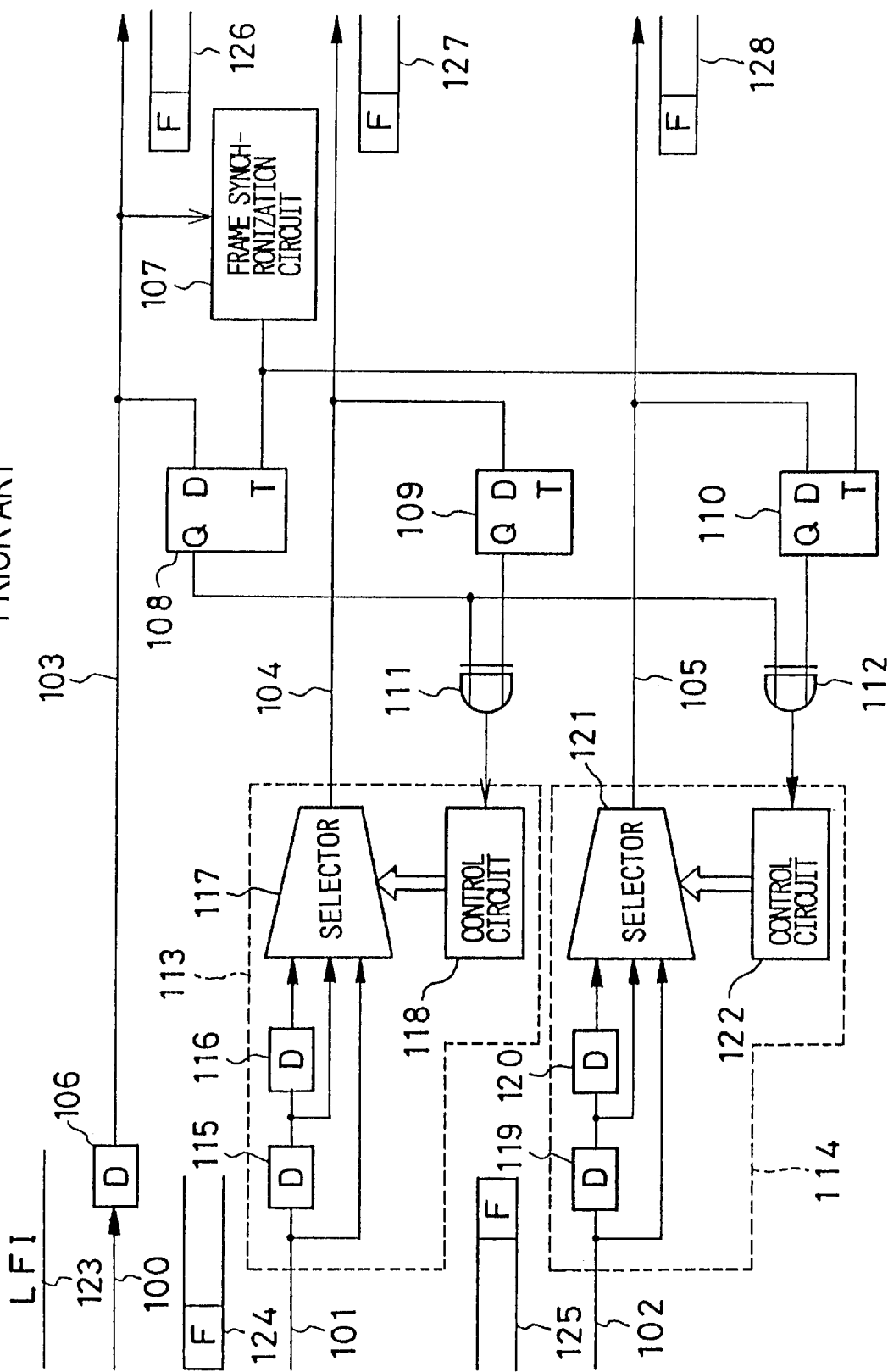
FIG. 12 shows another example of a frame synchronization system of the conventional parallel transmission system.

A fourth embodiment of the present invention is explained with reference to FIG. 9 showing its structure. Referring to FIG. 9, the present fourth embodiment uses polarization as the optical information for synchronization among the different transmission paths, and effectuates multiplexing based on the wavelength.

It is noted that the information on the polarization for synchronization needs to be introduced into only one wavelength state. If, for example, a skew adjustment signal is introduced into $\lambda 1$ (e.g., at a polarization rotating unit (p1+p2) 741), it suffices if the signal of the polarization p1 is transmitted at the wavelength of $\lambda 2$ to $\lambda M$, where M (positive integer) denotes the multiplexing degree. Of course, a skew adjustment signal may be applied to data at the wavelength of $\lambda 2$ to $\lambda M$, if this facilitates the control.

The method for skew adjustment may be carried out in the same way as in the above-described second embodiment, that is, a wavelength filter 731 is inserted ahead of the polarizing filter 761 to separate the multiplexed wavelengths. The post-separation processing is similar to that in the second embodiment using receivers 721, 722 and first buffers and second buffer. However, since it suffices if skew adjustment is made in one of the polarized states, the information of the other polarized state may be output at the same timing as that of the information on the first-stated data (e.g., p1).

The multiplexing degree differs with the fibers used. In the case of the multi-mode fiber, crosstalk between neighboring wavelengths occurs unless the neighboring wavelengths are separated from each other by the order of 4 nm or more. In the case of the single-mode fiber, the separation can be reduced to the order of 0.8 nm under the currently available technology. Therefore, a single mode fiber is preferred for raising the multiplexing degree, although the cost is higher.

The meritorious effect of the invention are summarised as follows.

According to the present invention, transmission only of the data length D, devoid of redundancy, is possible, as compared to the conventional system in which the header information of a length H is inserted for synchronization for the data length D, so that the data transfer efficiency is improved by a factor of 1+H/D. If the present invention is applied to, for example, the asynchronous transfer mode, the efficiency is improved by approximately 10%, whereby the data transfer throughput is improved to realize high-efficiency data transmission.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A parallel transmission method comprising:

changing the transmission wavelength on a transmitting side at a pre-set synchronization timing of data transmitted on parallel transmission paths;

detecting these changes in wavelength on a receiving side; and synchronizing the data transmission among respective transmission paths of the parallel transmission paths based on the detected changes.

2. A parallel transmission method comprising:

changing the state of polarization on a transmitting side at a pre-set synchronization timing of data transmitted on parallel transmission paths;

detecting these changes in polarization on a receiving side; and synchronizing the data transmission among respective transmission paths of the parallel transmission paths based on the detected changes.

3. A parallel transmission method comprising:

changing the frequency on a transmitting side at a pre-set synchronization timing of data transmitted on parallel transmission paths;

detecting these changes on a receiving side; and synchronizing the data transmission among respective transmission paths of the parallel transmission paths based on the detected changes.

4. A parallel transmission system comprising:

a transmitter at each of transmission paths for parallel transmission capable of outputting signals of at least two wavelengths, said transmitter transmitting data signals for transmission as said transmitter switches from a first one of said wavelengths to a second one of said wavelengths at a certain synchronization timing;

a wavelength filter provided at a pre-stage of a receiver receiving said data signals on each transmission path for separating said first wavelength and said second wavelength from each other;

said receiver receiving first data and second data separated in association with said first and second wavelengths, said receiver causing the received first and second data to be stored in first and second storage devices, respectively, said receiver detecting the data signals with a maximum delay on said transmission paths; and a synthesizer for synthesizing the first and second data from said first and second storage devices and for performing control to output the synthesized data simultaneously on the respective transmission paths in the timing of the data with said maximum delay.

5. A parallel transmission system comprising:
a transmitter at each of transmission paths for parallel transmission capable of outputting signals of at least two wavelengths, said transmitter transmitting data signals for transmission as said transmitter switches from a first one of said wavelengths to a second one of said wavelengths at a certain synchronization timing;
branching means for branching data transmitted from each transmission path to a first route and a second route for each transmission path;
information on said first route being directly stored as data signals in a third storage device;
a wavelength filter at a pre-stage of a receiver receiving information of said second route for separating the first and second wavelengths from each other;
said receiver receiving first data and second data separated in association with said first and second wavelengths, said receiver causing each of the received first and second data to be stored in first and second storage devices, respectively, said receiver detecting the data signals with a maximum delay on said transmission paths;
the data being simultaneously transmitted on the respective transmission paths in the timing of the data with said maximum delay from said third storage means provided in association with the respective transmission paths.

6. The parallel transmission system as defined in claim 5 wherein said branching means comprises a photocoupler.

7. A parallel transmission system comprising:
an optical transmitter at each of transmission paths for parallel transmission capable of outputting signals at different polarizations, said transmitter transmitting data signals for transmission as said optical transmitter switches from a first state of polarizations to a second state of polarization at a certain synchronization timing;
a polarization filter provided at a pre-stage of a receiver receiving said data signals on each transmission path for separating said data of first polarization and said data of second polarization from each other;
said receiver receiving first data and second data separated in association with said first and second polarizations, said receiver causing the received first and second data to be stored in first and second storage devices, respectively, said receiver detecting the data signals with a maximum delay on said transmission paths; and
a synthesizer for synthesizing the first and second data from said first and second storage devices and for performing control to output the synthesized data simultaneously on the respective transmission paths in the timing of the data with said maximum delay.

8. A parallel transmission system comprising:
a transmitter at each of transmission paths for parallel transmission capable of outputting signals at different polarizations, said transmitter transmitting data signals for transmission as said transmitter switches from a first one of said polarizations to a second one of said polarizations at a certain synchronization timing;
a photocoupler disposed on a receiving side, for branching data sent from each of said transmission paths to first and second routes for each transmission path;
information on said first route being directly stored as data signals in a third storage device;
a polarization filter for separating data of said first polarization and data of said second polarization from each other, at a pre-stage of a receiver receiving the information of the second route;
said receiver receiving first data and second data separated in association with said first and second polarizations, said receiver causing the received first and second data to be stored in first and second storage devices, respectively, said receiver detecting the data signals with a maximum delay on said transmission paths;
said data signals being simultaneously output for the respective transmission paths in the timing of the data with the maximum delay from said third storage device provided in the respective transmission paths.

9. A parallel transmission system comprising:
a multiplexer on a transmitting side for multiplexing polarized signals from a plurality of optical transmitters and for transmitting the multiplexed polarized signals on transmission paths;
a polarization filter provided at a pre-stage of a receiver for separating data of first polarization and data of second polarization multiplexed and transmitted on the respective transmission paths;
a wavelength filter for separating said first polarization, from said second polarization, into a first wavelength and a second wavelength;
said receiver receiving first data and second data separated in association with said first and second wavelengths, respectively, said receiver causing the received first and second data to be stored in first and second storage devices, respectively, said receiver detecting the data signals with a maximum delay on said transmission paths;
the second data of polarization being directly stored in a third storage device; and
control means for causing data from said first and second storage devices to be synthesized and for causing the synthesized data and the data from said third storage device to be output simultaneously to the respective transmission paths in the timing of the data with the maximum delay.

10. A parallel transmission system comprising:
a multiplexer on a transmitting side for multiplexing wavelengths from a plurality of optical transmitters and for transmitting the multiplexed wavelengths on transmission paths;
a wavelength filter on a receiving side for separating data of plural wavelengths multiplexed and transmitted on the transmission paths;
a polarization filter for separating a first one of said separated plural wavelengths into first polarization and second polarization;
receiver for receiving first data and second data separated in association with said first and second polarizations, said receiver causing the received first and second data to be stored in first and second storage devices, respectively, said receiver detecting the data signals with a maximum delay on said transmission paths;
said receiver receiving the second and following wavelengths and storing the received wavelengths in an associated storage device; and means for performing control for synthesizing data from said first and second storage means for the respective transmission paths and for causing the synthesized data and data from storage means provided in association with the second and the following wavelengths to be outputted simultaneously on the transmission paths in the timing of the data with the maximum delay.

11. A parallel transmission system comprising:

a transmitter at each of transmission paths for parallel transmission capable of outputting signals of at least two frequencies, said transmitter transmitting data signals for transmission as said transmitter switches from a first one of said frequencies to a second one of said frequencies at a certain synchronization timing;

wherein the signals transmitted in parallel in the respective transmission paths are electrical signals;

a frequency filter provided at a pre-stage of a receiver receiving said data signals on each transmission path for separating said first frequency and said second frequency from each other;

said receiver receiving first data and second data separated in association with said first and second frequencies, said receiver causing the received first and second data to be stored in first and second storage devices, respectively, said receiver detecting the data signals with a maximum delay on said transmission paths; and a synthesizer for synthesizing the first and second data from said first and second storage devices and for performing control to output the synthesized data simultaneously on the respective transmission paths in the timing of the data with said maximum delay.

12. A parallel transmission system comprising:

a transmitter at each of transmission paths for parallel transmission capable of outputting signals of at least two frequencies, said transmitter transmitting data signals for transmission as said transmitter switches from a first one of said frequencies to a second one of said frequencies at a certain synchronization timing;

wherein the signals transmitted in parallel in the respective transmission paths are electrical signals;

branching means for branching data transmitted from each transmission path to a first route and a second route for each transmission path;

information on said first route being directly stored as data signals in a third storage device;

a frequency filter at a pre-stage of a receiver receiving information of said second route for separating the first and second frequency from each other;

said receiver receiving first data and second data separated in association with said first and second frequencies, said receiver causing each of the received first and second data to be stored in first and second storage devices, respectively, said receiver detecting the data signals with a maximum delay on said transmission paths; and the data being simultaneously transmitted on the respective transmission paths in the timing of the data with said maximum delay from said third storage means provided in association with the respective transmission paths.

* * * * *